Figure 1:
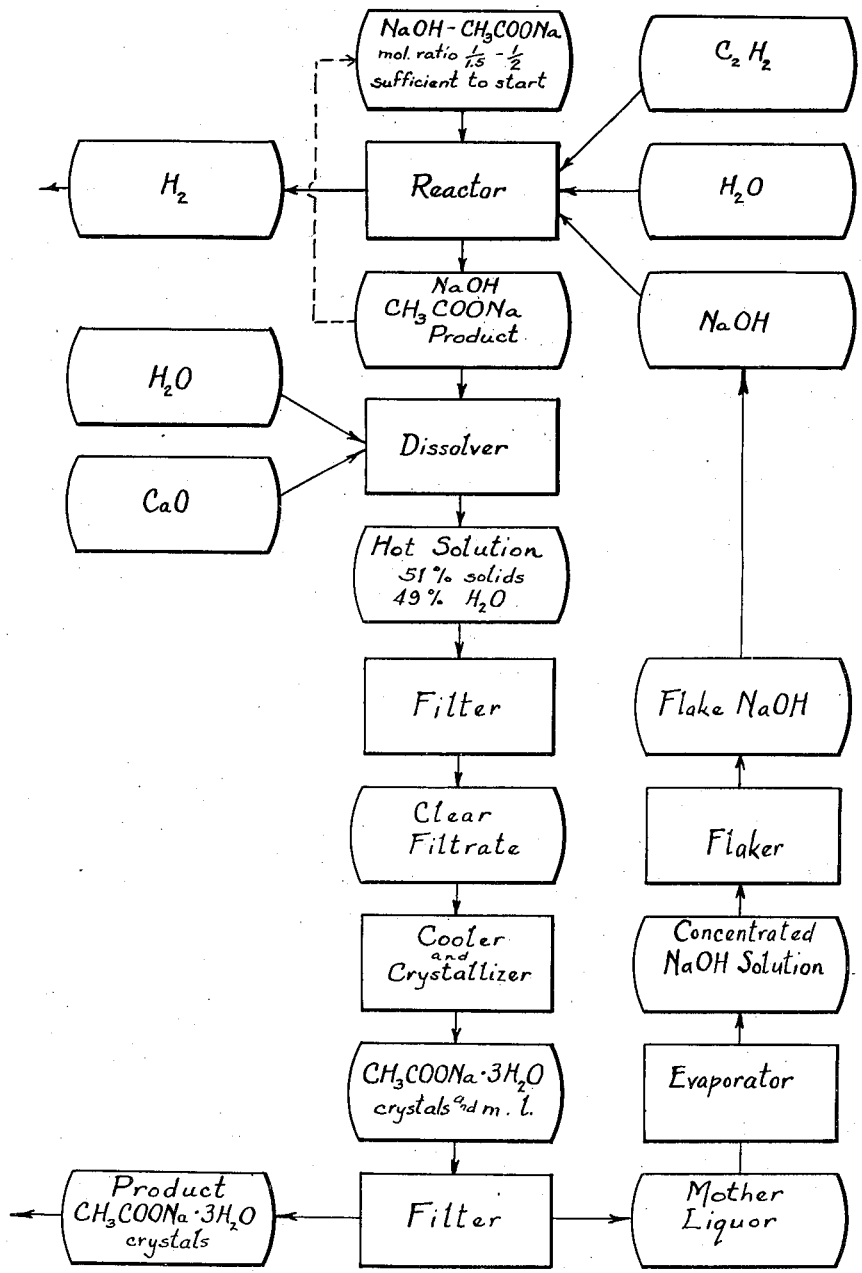

Patented July 5, 1932

1,866,328

UNITED STATES PATENT OFFICE

CHARLES J. STROSACKER AND WILBUR T. STEPHENSON, OF MIDLAND, MICHIGAN, ASSIGNORS TO THE DOW CHEMICAL COMPANY, OF MIDLAND, MICHIGAN, A CORPORATION OF MICHIGAN

CONTINUOUS METHOD OF MAKING ALKALI-METAL ACETATES

Application filed December 5, 1929. Serial No. 411,976.

This invention has regard to methods for preparing an alkali metal acetate by reacting an alkali metal hydroxide and acetylene in the presence of water. The reaction is represented by the equation:

(1) $C_2H_2 + MOH + H_2O = CH_3COOM + H_2$ wherein M is an alkali metal, e. g. sodium or potassium. In a prior application Ser. No. 323,199, filed Dec. 1, 1928, a method of the above general character has been disclosed wherein a closed reactor is charged with a solid alkali metal hydroxide, e. g. sodium hydroxide, in comminuted form and heated to a temperature preferably between 200° and 300° C. Thereupon acetylene and water are introduced until a gas pressure of about 50 pounds per square inch is built up, the supplies then being shut off and the mixture of solids and gases allowed to react, with suitable stirring to expose fresh solid surfaces, until a sample of the gas upon testing is found to be substantially free from acetylene. Then the waste gas, consisting chiefly of hydrogen with a little water vapor, is vented, a fresh charge of acetylene and water introduced, and the operation repeated. Proceeding in this way with alternate charging and reacting periods a yield of acetate in excess of 90 per cent, based upon either the acetylene or alkali employed, may be obtained.

Such mode of operation, however, is subject to certain disadvantages, particularly when applied in large scale commercial apparatus. For example, we have found that a uniform reaction rate is not maintained throughout the duration of the entire reaction. The initial reaction starts slowly and reluctantly, then proceeds very rapidly over a considerable period, at times with almost instantaneous absorption of the acetylene, and finally diminishes gradually in speed until the time required to react a single charge of acetylene becomes excessively long. During the intermediate period, when optimum conditions prevail, the heat of reaction developed is sufficient to maintain an approximately uniform reaction temperature, but with the intermittent mode of operation described in the aforesaid application the temperature fluctuates greatly and other irregularities are encountered which at times greatly interfere with the proper control of the process, while frequently heat from an outside source must be provided for maintaining the apparatus with its charge at the desired temperature.

Another unfavorable circumstance is that only a relatively small weight of acetylene can be introduced into the closed reaction chamber at one time. Experience has shown that at the beginning of the reaction there are approximately 150 molecular equivalents of alkali metal hydroxide present in a usual charge to one equivalent of acetylene. In order to procure the reaction of the major portion of such hydroxide, therefore, it is necessary to introduce in the neighborhood of 150 separate charges of acetylene, thus involving considerable loss of time from frequent stopping and starting of apparatus, and also an unduly large amount of handling and supervision of the apparatus.

Still another disadvantage is the danger of explosion, when working with acetylene under pressure. The safe upper limit of pressure in the present process, when a rich acetylene gas is used, lies between 50 and 65 pounds per square inch, and in order to employ such pressures without risk of occasional slight explosions accompanied by decomposition of materials it is necessary to maintain about one atmosphere steam pressure in the reactor at all times.

For the foregoing reasons, it becomes desirable to devise an improved mode of operation whereby the process may be conducted continuously over considerable periods of time at a fairly uniform temperature and at about atmospheric pressure. The invention, accordingly, consists in the steps hereinafter fully described and particularly pointed out in the claims, the annexed drawing and following description setting forth but a few of the various ways in which the principle of the invention may be used.

In said annexed drawing, the single figure is a flow sheet illustrating one mode of procedure for carrying out the invention.

We have found that, although the reaction in accordance with the Equation (1) is somewhat slow to start when the alkali metal hydroxide is the sole solid present, as soon as a small amount of acetate has been formed the reaction rate is increased very rapidly. Consequently, if operation is started with a mixture of alkali metal hydroxide and acetate, the initial sluggishness of the reaction is avoided and it proceeds at once at the normal rate.

We have also found that the optimum reaction rate is sustained without appreciable slackening until approximately two thirds of the amount of alkali in the original charge has been reacted. In other words, so long as the solids contain at least 1 mole unreacted alkali metal hydroxide to 2 moles alkali metal acetate the reaction rate will not be retarded to any material extent. By adding fresh alkali metal hydroxide, either continuously or at intervals, to the reaction mixture so as to maintain a molecular ratio of hydroxide to acetate approximately equal to, or somewhat in excess of, 1 to 2 and discharging an equivalent amount of reacted material, it is feasible to institute a continuously operating procedure under optimum conditions, thus effecting considerable savings in labor and handling of materials and greatly increasing the output for a given size of apparatus. Under such improved procedure the process may be rendered almost entirely self-sustaining thermally, inasmuch as the heat of reaction, as aforesaid, is sufficient to maintain the requisite temperature steadily while the optimum reaction rate continues in effect.

Such modified form of procedure involves working up a reaction product containing approximately 1 mole caustic alkali to 2 moles alkali metal acetate and separating the two compounds from each other. This can be satisfactorily accomplished by dissolving the reaction mixture in water to form a solution of suitable concentration and crystallizing out the acetate, leaving the alkali metal hydroxide in solution. A highly pure acetate product may be prepared in this way, while the residual solution may be evaporated to recover the alkali metal hydroxide, which is returned to the process.

We have further found that the amount of water present, either as vapor or absorbed by the solid reactants, and the manner of introducing the same, have an important influence upon the course of the reaction. As already set forth in the prior application referred to above, it is essential that the amounts of water present at any time shall be insufficient to cause fusion or liquefaction of the reaction mixture. On the other hand, a deficiency of water may lead to more or less decomposition of the product, according to the equation:

(2) $CH_3COOM + MOH = M_2CO_3 + CH_4$

Preferably the water is to be introduced along with the acetylene and at about the same rate so that approximately equimolecular quantities of the two may be used. The water may be present somewhat in excess, however, at least temporarily, without materially interfering with the course of the reaction, depending somewhat upon the temperature and the composition of the mixture of alkali metal hydroxide and acetate actually present. In general, the higher the acetate content the greater the excess of water that can be absorbed without tending to liquefy the mixture, but in any case it is inadvisable to have more than about 100 per cent excess of water over acetylene in the reaction zone.

The water may be introduced in various ways, as steam or as an aqueous alkali metal hydroxide solution. A particularly advantageous manner of adding the water, which is adapted to a continuous mode of operation, consists in saturating the acetylene with water vapor by bubbling the gas through water and then passing the mixture of gas and vapor into the reactor. This permits an easy regulation of the relative amounts of acetylene and water that are admitted to the reaction by controlling the temperature of the water through which the gas is bubbled. Since the vapor tension of water is very nearly equal to one half normal atmospheric pressure at a temperature of 81.6° C., it follows that, by maintaining the water through which the acetylene is bubbled at such temperature, the issuing mixture of gas and vapor will contain substantially equal volumes, or equal moles, of each; that is, the theoretical combining proportions called for according to Equation (1). A slight deviation from the temperature given, or fluctuations of temperature within a few degrees either way, will not alter the proportions of acetylene and water vapor sufficiently to affect the reaction materially. Likewise, temperature adjustment may be made according to the existing barometric pressure, while by increasing the water temperature an excess of water vapor may be provided for the reaction, if so desired.

For carrying out our improved method or process we may proceed, for example, in the manner described below, but it is understood that the detailed procedure there given is presented for the purpose of illustration, and that the invention shall not be limited thereby except as hereinafter specifically provided in the claims. The sequence of steps therein will appear upon referring to the flow sheet.

A stationary horizontal cylindrical reactor of iron or steel, provided with suitable stirring means, is charged about one half full with the product of a previous run, for example, 1500 pounds of a solid, comminuted mixture containing 20.6 per cent NaOH and 75.5 per cent $CH_3COONa$, by weight, corresponding very nearly to a molecular ratio of $$\frac{NaOH}{CH_3COONa} = \frac{1}{1.78}.$$

The temperature of the charge is raised to approximately 280° to 290° C. by means of external heating. A quantity of about 200 pounds of commercial flake sodium hydroxide is then added, the solids being kept actively in motion by means of the stirrer, and through a suitable inlet at one end of the reactor a mixture of approximately equal parts by volume of acetylene and water vapor is admitted, such mixture having been conveniently prepared by bubbling acetylene gas through a body of water at a temperature between 80° and 85° C. as already described. The rate of introduction of the acetylene-water vapor mixture is regulated so that the heat of reaction maintains the temperature within the reactor between about 250° and 290° C. From this point, then, the process is thermally self-sufficient and no further heat from an external source is required. The exit gases issuing from the outlet therefor provided at the opposite end of the reactor consist of 95 per cent or more hydrogen, figured on a dry basis. Additional quantities of about 50 pounds each of flake sodium hydroxide are charged in at intervals of about 10 minutes until the space within the reactor is about two thirds filled. Thereafter the flow of gas is continued until an analysis of a sample of the charge shows that the NaOH content thereof has fallen to about 20 per cent. Then a quantity of about 1000 pounds of reaction product is discharged through a suitable outlet provided therefor without necessarily interrupting the flow of gas, after which the regular addition of sodium hydroxide is resumed and operation continued as before.

The material discharged from the reactor in a more or less pulverulent form is allowed to cool, and then dissolved in sufficient water to form a solution that is saturated with respect to the hydrated sodium acetate, $CH_3COONa.3H_2O$, at a temperature between about 60° and 70° C. A representative analysis of such material is:

| | Per cent |
|---|---|
| $CH_3COONa$ | 72.5 |
| NaOH | 20.2 |
| $Na_2CO_3$ | 4.4 |
| NaCl | 1.4 |
| $H_2O$ | 1.5 |

A solution thereof saturated with hydrated sodium acetate at 60° C. contains approximately 51 per cent anhydrous solids and 49 per cent water. The solution is warmed to, say, 100° C. and treated with lime to causticize most of the carbonate content thereof, and then filtered hot to remove the precipitated $CaCO_3$ and other insolubles, e. g. iron hydrate, in case the material contains traces of iron compounds. The clear filtrate is then cooled to crystallize out hydrated sodium acetate. The latter operation may conveniently be carried out in two stages, first cooling by natural means to about room temperature to produce a first crop of crystals, which are separated, and then cooling with artificial refrigeration to about 0° C. to produce a further crop of crystals. The crystals are washed with water and purified from traces of NaOH by recrystallizing from water solution. By this means as much as 96 per cent of the acetate may be separated as crystals of composition $CH_3COONa.3H_2O$, leaving a mother liquor containing substantially all of the sodium hydroxide together with the small remainder of the acetate. The mother liquor may be evaporated to remove water, solidified and flaked without decomposing the acetate contained therein, and the recovered product may then be returned to the process. It is also possible to separate the acetate from the reaction product by crystallizing as the anhydrous salt from more concentrated solutions than those just referred to, but the latter method is less desirable owing to the form of the anhydrous crystals as usually obtained which are difficult to filter and wash clean.

The method of procedure just described in detail may be defined as being semi-continuous in character. In other words, the feeding of solid materials and the discharging of solid product is intermittent, whereas the introduction and discharge of gaseous materials and products is for all practical purposes continuous, and most of the advantages inherent in continuous operation are realized. However, the method is easily capable of being adapted to a fully continuous mode of operation by provision for a continuous feed of flake or powdered sodium hydroxide, and for a continuous discharge of solid product.

The reaction proceeds with rapid conversion of materials to acetate product within the temperature range of 250° to 290° C. specified in the detailed example. However, by suitably adjusting the rates of supply of gas and alkali metal hydroxide, a good conversion may be achieved at temperatures as low as 200° C. Temperatures higher than 290°, e. g. up to about 300° C. or somewhat higher may also be employed, but at the risk of reaching or exceeding the fusion point of the solid mixture of sodium hydroxide and acetate, and decomposition of acetate product also commences at temperatures between 300° and 325° C. In general, therefore, a satisfactory temperature range is between 200° and 300° C., with a preferred range of about 250° to 290° C.

The composition of the solid reaction mixture is preferably to be controlled so that the ratio by weight of NaOH to CH₃COONa is between the limits of 2/5 and 2/8, corresponding approximately to a molecular ratio of from 1/15 to 1/2. Within such limits the mixture remains sensibly dry at all times with the usual control of temperature and of water introduced. When the proportion of NaOH is increased it becomes more difficult to prevent fusion of the mixture, while if the content of NaOH falls much below the limit stated the reaction rate is diminished and material losses of acetylene in the exit gases may occur.

Under the conditions herein described, using a rich acetylene gas, the reaction is carried out at substantially atmospheric pressure, so that the hazard of explosion, which exists when the process is conducted under pressure, is entirely eliminated. However, the method is also adapted for utilizing gas mixtures of acetylene with other hydrocarbons of the methane or ethylene series, hydrogen, etc., care being taken that air or oxygen is not allowed to gain access to the mixture. When such diluted mixtures are reacted it may be advantageous to employ moderate pressure in order to maintain about the same concentration of acetylene in the reaction chamber as above without materially increasing the gas velocity, which may safely be done under such condition without introducing any risk of explosion. Otherwise no essential modification of the procedure already described would be called for.

Apparatus details mentioned in the description do not imply any limitation upon the type or form thereof, or materials of construction therefor, which may be employed in carrying out the invention. Other forms of apparatus, e. g. a revolving reactor equipped with any suitable means for stirring or mixing the charge therein, may be used, if desired.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making an alkali metal acetate which comprises providing a mixture of the corresponding hydroxide and acetate in comminuted form at a temperature above 200° C., but below that at which decomposition of acetate occurs, continuously introducing acetylene and water vapor thereto, while stirring the same, discharging reacted solid product and separating alkali metal acetate from unreacted hydroxide therein.

2. The method of making an alkali metal acetate which comprises providing a mixture of the corresponding hydroxide and acetate in comminuted form at a temperature above 200° C., but below that at which decomposition of acetate occurs, continuously introducing acetylene and water vapor thereto, while stirring the same, discharging reacted solid product, dissolving such product in water and crystallizing alkali metal acetate from the solution.

3. The method of making an alkali metal acetate which comprises providing a mixture of the corresponding hydroxide and acetate in comminuted form at a temperature above 200° C., but below that at which decomposition of acetate occurs, continuously introducing acetylene and water vapor thereto, while stirring the same, discharging reacted solid product, dissolving such product in water, crystallizing alkali metal acetate from the solution, separating the crystals, dehydrating the residual mother liquor containing alkali metal hydroxide together with a small amount of acetate and returning such dehydrated material to the principal reaction.

4. The method of making an alkali metal acetate which comprises providing a sensibly dry mixture of the corresponding hydroxide and acetate in comminuted form, and at a temperature between 200° and 300° C., continuously introducing acetylene and water vapor in aproximately equimolecular proportion thereto, while stirring the same, maintaining a molecular ratio of alkali metal hydroxide to acetate in the reaction mixture between about 1/15 and 1/2 by further additions of such hydroxide, discharging reacted solid product and recovering the acetate from the product.

5. The method of making an alkali metal acetate which comprises providing a sensibly dry mixture of the corresponding hydroxide and acetate in comminuted form, and at a temperature between 200° and 300° C., continuously introducing acetylene and water vapor in approximately equimolecular proportion thereto, and at such rate that the temperature of the mixture is maintained between the limits stated, while stirring the same, maintaining a molecular ratio of alkali metal hydroxide to acetate in the reaction mixture between about 1/15 and 1/2 by further additions of such hydroxide, discharging reacted solid product, dissolving such product in water and crystallizing the acetate from the solution.

6. The method of making an alkali metal acetate which comprises providing a sensibly dry mixture of the corresponding hydroxide and acetate in comminuted form, and at a temperature between 200° and 300° C., continuously introducing acetylene and water vapor in approximately equimolecular proportion thereto, and at such rate that the temperature of the mixture is maintained between the limits stated, while stirring the same, maintaining a molecular ratio of alkali metal hydroxide to acetate in the reaction mixture between about $\frac{1}{15}$ and $\frac{1}{2}$ by further additions of such hydroxide, discharging reacted solid product, dissolving such product in water, crystallizing the acetate from the solution, separating the crystals, dehydrating the residual mother liquor containing alkali metal hydroxide together with a small amount of acetate and returning such dehydrated material to the principal reaction.

7. The method of making sodium acetate which comprises providing a sensibly dry mixture of sodium hydroxide and sodium acetate in comminuted form and at a temperature above 250° C. but below that at which decomposition of the acetate occurs, continuously introducing acetylene and water vapor in approximately equimolecular proportion thereto and at such rate that the temperature of the mixture is maintained between the limits stated, while stirring the same, maintaining a molecular ratio of sodium hydroxide to acetate in the reaction mixture between about $\frac{1}{15}$ and $\frac{1}{2}$ by further addition of such hydroxide, discharging reacted solid product and recovering sodium acetate from the product.

8. The method of making sodium acetate which comprises providing a sensibly dry mixture of sodium hydroxide and sodium acetate in comminuted form and at a temperature above 250° C. but below that at which decomposition of the acetate occurs, continuously introducing acetylene and water vapor in approximately equimolecular proportion thereto and at such rate that the temperature of the mixture is maintained between the limits stated, while stirring the same, maintaining a molecular ratio of sodium hydroxide to acetate in the reaction mixture between about $\frac{1}{15}$ and $\frac{1}{2}$ by further addition of such hydroxide, discharging reacted solid product, dissolving such product in water and crystallizing sodium acetate as $CH_3COONa.3H_2O$ from the solution.

9. The method of making sodium acetate which comprises providing a sensibly dry mixture of sodium hydroxide and sodium acetate in comminuted form and at a temperature above 250° C. but below that at which decomposition of the acetate occurs, continuously introducing acetylene and water vapor in approximately equimolecular proportion thereto and at such rate that the temperature of the mixture is maintained between the limits stated, while stirring the same, maintaining a molecular ratio of sodium hydroxide to acetate in the reaction mixture between about $\frac{1}{15}$ and $\frac{1}{2}$ by further addition of such hydroxide, discharging reacted solid product, dissolving such product in water, crystallizing sodium acetate as $CH_3COONa.3H_2O$ from the solution, separating the crystals, dehydrating the residual mother liquor containing sodium hydroxide together with a small amount of acetate and returning such dehydrated material to the principal reaction.

10. In the manufacture of sodium acetate by reacting sodium hydroxide with acetylene and water at a temperature between about 200° and about 300° C. to produce a mixture of said acetate and unreacted hydroxide, the method of recovering the acetate from such mixed product which comprises dissolving the same in water, crystallizing a substantial portion of the acetate from the solution as $CH_3COONa.3H_2O$, separating the crystals and returning the hydroxide and residual acetate in the mother liquor to the principal reaction.

11. In the manufacture of sodium acetate by reacting sodium hydroxide with acetylene and water at a temperature between about 200° and about 300° C. to produce a mixture of said acetate and unreacted hydroxide, the method of recovering the acetate from such mixed product which comprises dissolving the same in water, crystallizing a substantial portion of the acetate from the solution as $CH_3COONa.3H_2O$, separating the crystals, dehydrating the mother liquor containing sodium hydroxide and the residual acetate and returning such dehydrated mixture of the principal reaction.

Signed by us this 29th day of November, 1929.

CHARLES J. STROSACKER.
WILBUR T. STEPHENSON.